(12) United States Patent
Fomin et al.

(10) Patent No.: US 9,217,840 B2
(45) Date of Patent: Dec. 22, 2015

(54) LOW-MODE HIGH POWER FIBER COMBINER

(71) Applicant: IPG PHOTONICS CORPORATION, Oxford, MA (US)

(72) Inventors: Valentin Fomin, Burbach (DE); Andrey Abramov, Burbach (DE); Dmitry Mochalov, Burbach (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 5 days.

(21) Appl. No.: 14/186,782

(22) Filed: Feb. 21, 2014

(65) Prior Publication Data

US 2014/0241385 A1 Aug. 28, 2014

Related U.S. Application Data

(60) Provisional application No. 61/770,599, filed on Feb. 28, 2013.

(51) Int. Cl.
*G02B 6/26* (2006.01)
*G02B 6/42* (2006.01)
*G02B 6/40* (2006.01)
*G02B 6/14* (2006.01)

(52) U.S. Cl.
CPC .............. *G02B 6/4296* (2013.01); *G02B 6/14* (2013.01); *G02B 6/262* (2013.01); *G02B 6/40* (2013.01)

(58) Field of Classification Search
CPC ...... G02B 27/0905; G02B 6/14; G02B 6/2856
USPC .................. 385/115, 29; 359/349
See application file for complete search history.

(56) References Cited

U.S. PATENT DOCUMENTS

2010/0278486 A1* 11/2010 Holland et al. ............... 385/43
2012/0105968 A1* 5/2012 Chann et al. ................. 359/634
2012/0300797 A1* 11/2012 Durkin et al. ................. 372/6

* cited by examiner

*Primary Examiner* — Ryan Lepisto
(74) *Attorney, Agent, or Firm* — Yuri Kateshov, Esq.; Timothy J. King, Esq.

(57) ABSTRACT

A high power fiber laser system is configured with a combiner end fiber spliced to a combiner output fiber. The system further includes a light stripper extending along the combiner end and output fibers and configured with sequentially located zones which are provided with respective refractive indices. In a forward propagating direction of light signal, the upstream zone includes polymeric material with the refractive index higher than that of the cladding of the combiner end fiber. This zone is configured to remove the backreflected core guided light bled into the cladding of the combiner through a splice between combiner end and output fibers. The intermediate zone includes polymeric material configured with a refractive index lower than that of the cladding of the combiner output fiber so it can prevent clad guided signal light from decoupling the cladding under the material. The downstream zone is configured with polymeric material having a refractive index lower than that of the cladding of the combiner output fiber. The polymeric material of the downstream zone is impregnated with a plurality of light diffusers scattering high numerical aperture rays of the clad-guided signal light.

18 Claims, 2 Drawing Sheets

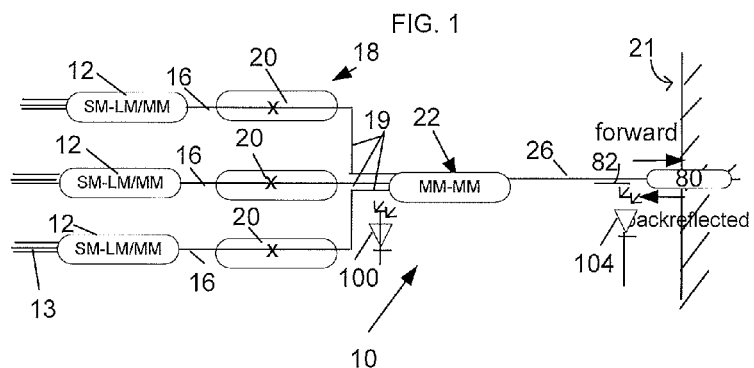
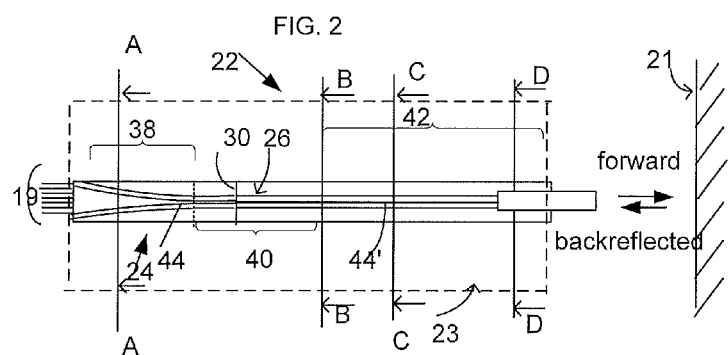
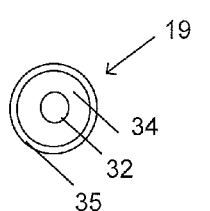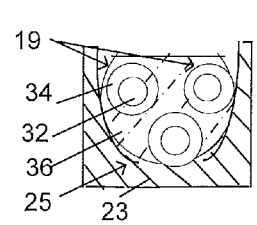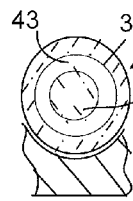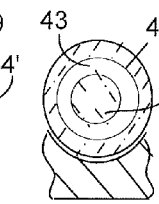
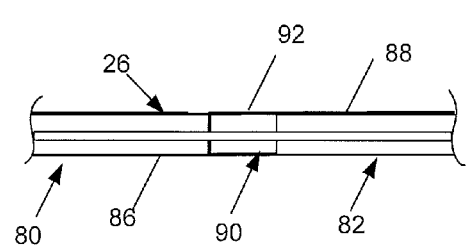

LOW-MODE HIGH POWER FIBER COMBINER

CROSS-REFERENCE TO RELATED APPLICATION

This application is related to U.S. Provisional Application Ser. No. 61/770,607 concurrently filed with this application with the USPTO and is fully incorporated herein by reference in its entirety.

BACKGROUND OF THE DISCLOSURE

1. Field of the Disclosure

The disclosure relates to high power fiber laser systems. Particularly, the disclosure relates to a high power low-loss low-mode ("LM") fiber system emitting a kW level, high quality laser output and configured with a cladding mode absorber which is operative to efficiently filter out unwanted forward propagating and backreflected cladding light.

2. Prior Art

High power kW-level fiber laser systems are used in a growing number of applications. As fiber lasers mature towards commercial deployment, an intense focus on their power, quality and reliability and that of their components is required. With the current progress in this field, reliability requirements are made at increasingly higher power levels reaching the multi-kilowatt levels. To enable the desired power levels, multiple single mode ("SM") fiber laser systems are optically and mechanically coupled together in a combiner. To efficiently perform at kW power levels and emit an output, having a low mode ("LM") output, the combiner should successfully deal with a the structural difficulties some of which, such as mechanical coupling of fibers and power loses in forward and backreflection directions, are of a particular interest here.

In general, a process of fabricating high power combiner includes fusing aligned output fibers of respective fiber lasers/amplifiers in a bundle, tapering the latter, cleaving and splicing the tapered bundle to a system output delivery fiber. The fabrication of the combiner which initially assumes a bow-tie configuration, whose waist is further severed in half, may result in structural defects (burrs) of cladding which further, during the combiner's deployment, may detrimentally affect the quality of the output laser beam and power thereof With outputs of fiber laser systems reaching several kWs, forward propagating core-guide light tend to bleed into a cladding as it propagates through and air-quartz interfaces. Once in the cladding, high power signal light induces thermal loads on a polymeric coating surrounding the cladding and shielding the fiber from mechanical loads.

Accordingly, a need exists in a device capable of efficiently dealing with undesirable consequences of forward propagating signal light decoupled from the core.

In addition to forward propagating signal light, light reflected from the surface to be laser treated and hence further referred to as a backreflected light is also damaging both to a combiner itself and to system components upstream therefrom. Similar to forward propagating light, backreflected light has to be removed from a waveguide before it propagates back into individual fiber laser systems.

In summary, to attain an optical power of up to kWs at the output of the LM waveguide, the combiner needs a special configuration which would allow the following:

(1) Reliably fix input fibers together without degrading the quality of the output beam;

(2) Efficiently distribute and utilize power losses of forward and backward propagating light; and (3) Provide protection of the fibers from environmental impurities as a result of heat-induced deformation.

A further need exists for a high power fiber laser system based on the above discussed SM-LM combiner and capable of emitting a high quality product parameter beam reaching several kWs.

A need therefore, exists for a LM high power fiber laser system provided with a clad absorber which is configured to meet the above-listed conditions.

SUMMARY OF THE DISCLOSURE

In accordance with one aspect of the disclosure, the output fibers of respective individual SM fiber laser systems have a multi-layer configuration so as to improve reliable coupling among SM output fibers and minimize the possibility of damaging fiber cores during the fabrication of SM-LM combiner, The multi-layer configuration includes inner and outer layers. The inner layer includes silicone dioxide ($SiO_2$), whereas the outer layer is made from $SiO_2$ doped with ions of fluorine ("F") and having a relatively low melting temperature. The presence of the outer layer substantially minimizes damage to individual fiber components during fabrication of the combiner.

In accordance with another aspect of the disclosure, the SM-LM combiner is configured with an absorber capable of efficiently removing unwanted forward propagating and backreflected light. The absorber is configured with three consecutive zones responsible for removing unwanted light which has two sources of origin. One source includes losses of forward propagating signal light as it is guided through splice regions, The other source has its origin in backreflected light which is coupled into the core of the system's output upon bouncing back from the surface of the workpiece in a counter-propagating direction, and finds its way to claddings of respective fibers as it is guided towards SM output fibers.

Viewed along a forward propagation direction of signal light, the upstream zone is configured to prevent backreflected light from reaching individual SM fiber laser systems. The zone is defined by a polymer having a refraction index higher than that of quartz.

The intermediary zone is configured to prevent high aperture rays of signal light lost at upstream splices and guided along a cladding in a forward propagating direction from escaping the combiner, The polymer constituting this zone is configured with a refractive index substantially the same as or lower than that of quartz.

The downstream zone is configured to scatter forward propagating signal light after it exits the intermediary zone. This is realized by polymeric host material with a refractive index equal to or lower than that of quartz, but impregnated with light diffusers which gradually guide cladding light outside the output fiber to a heat sink.

A further aspect deals with a high power LM fiber laser system including the disclosed combiner. The system is configured with a filtering splice removing high aperture rays of signal light remaining after the combiner from propagating further towards the workpiece. The filtering splice includes material with a refractive index higher than that of quartz. The system also has a downstream component—cladding mode absorber—configured to minimize and provide removal of backreflected light which is coupled into the cladding of the system's output fiber.

BRIEF DESCRIPTION OF THE DRAWINGS

The above and other features and advantages of the disclosed structure become more readily apparent from the following specific description accompanied by the drawings, in which:

FIG. 1 is an elevated view of the disclosed high power fiber laser system;

FIG. 2 is a diagrammatic view of a SM-LM combiner component of the system of FIG. 1;

FIGS. 2a-2d are respective cross-sections along lines A-A, B-B, C-C and D-D of FIG. 2;

FIG. 2a' is an end view of individual fiber prior to the removal of the protective layer.

FIG. 3 illustrates the preferred geometry of the disclosed SM-LM combiner;

SPECIFIC DESCRIPTION

Figure 4:
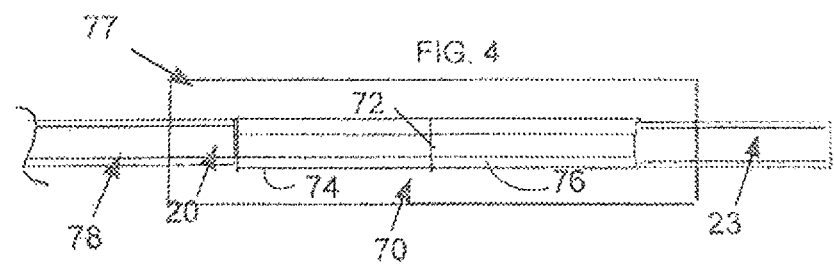
FIG. 4 is a diagrammatic view of the filter splice component of the disclosed system operative to remove cladding-guided forward propagating signal light.

Reference will now be made in detail to the preferred embodiments of the disclosure. Whenever possible, same or similar reference numerals are used in the drawings and the description to refer to the same or like parts or steps. The drawings are in very simplified form and are not to precise scale.

FIG. 1 illustrates a diagrammatic view of high power fiber laser system 10 capable of emitting a high quality beam of up to a few kWs. The system 10 is configured with a plurality of SM fiber laser systems each of which is operative to emit radiation in a single or substantially single transverse mode. The SM laser systems are provided with respective SM output fibers 16 which are aligned and further mechanically and optically coupled to one another in a SM-LM combiner 18.

Referring to FIG. 2 in addition to FIG. 1, combiner 18 is formed initially by aligning output fibers with one another so as to define the upstream large diameter input end of the combiner. Thereafter, the aligned fibers are simultaneously fused and stretched into a small diameter output end with the cores of respective individual fibers merged into a combiner end fiber 19 which has a diameter substantially matching that of a combiner output fiber 20 and surrounded by a double clad structure.

The downstream end fiber 19 of combiner 18 is further spliced to passive multimode ("MM") combiner output fiber 20. Depending on the number of SM laser systems, a combined output may reach of up to about 15 kW and have, for example, a Beam Product Parameter ("BPP") ranging between about 1.5 to about 4.5 and configured so that signal light loses no more than about 1% of its power. The end fiber 19 and a part of output fiber 20 are placed in a housing 24 (FIG. 2), which in turn, is coupled to a heat sink not shown here. A filtering splice 70 (FIG. 1), including regions of respective combiner output fiber 20 and the following fiber portion of system 10, and system's clad mode absorber ("CMA") 80, provided along the downstream portions, complete system 10.

Referring specifically to FIG. 2, end fiber 19 is spliced to the upstream end of combiner output fiber 20 along a splice region 22. Given only as an example, the downstream end of combiner 18 may include about 20-25 mm of output fiber 20 after splice region 22. The degree of tapering depends on the diameter of output fiber 20.

The SM output fibers 16 are fixed to one another by any suitable adhesive. Due to high powers and therefore elevated temperatures, the adhesive includes a temperature resistant component which may be, for example, UV-15-TK.

Referring to FIG. 2a, which is a cross-sectional view along lines A-A in FIG. 2, and FIG. 3, the claddings of respective SM fibers 16 during the initial stage of the fabrication of combiner 18 each have a double clad structure surrounding a core 44. The inner clad 34 includes silicone dioxide ("$SiO_2$"). The outer clad 36 is configured with a mixture including a host material, such as $SiO_2$, doped with ions of fluorine ("F"). The use of the second outer layer considerably increases the resistance of SM fibers to mechanical stresses during the fabrication process of combiner 18.

The scaling of combiner 18 critically depends on how effectively unwanted light, which propagates along the combiner in opposite directions, is utilized. Typically, mechanisms dealing with light removal from the waveguide's cladding are called light strippers or light absorbers.

Returning to FIG. 2, a light stripper or clad mode absorber ("CMA") is provided along combiner 18 and a part of combiner's output fiber 20 and includes three consecutive upstream, intermediary and downstream zones 26, 28 and 30, respectively. All three are configured to selectively minimize the amount of stray light, which may propagate in opposite forward and backward directions, from damaging fiber and other optical components of laser system 10.

The upstream zone 26, extending along a major portion of taper and terminating at a short distance upstream from splice 22, is configured to at least minimize the amount of backreflected light guided along the core of combiner output fiber 20 before this light will reach individual SM laser systems 16. Backreflection is highly damaging to high power fiber laser systems. Even a hundred-watt back reflected light, which in the disclosed system may easily reach kW-levels, can be devastating to combiner 18, but even more so to individual SM systems 16 merging into the combiner and particularly to their respective polymeric coatings.

As light back reflects from workpiece 21, it is coupled both into the cladding and core of delivery fiber 25 (FIG. 1) which is configured with a numerical aperture ("NA") at least equal to or higher than the incident angle of the backreflected light. Since the overlap between end fiber 19 and output fiber 20 is not ideal, the backreflected light, propagating along the cores of respective fibers between system output fiber 25 and end fiber 19, fills up a greater area than the core of end fiber 19. Hence the light, which is not confined to the core of end fiber 19, bleeds out into the cladding and can be removed by high index polymer within the upstream zone of the absorber, as will be explained below.

In particular, light back reflected from workpiece 21 is coupled into a core 44' (FIG. 2d) of MM system delivery fiber 25 (FIG. 1) which guides the back reflected light in a counter-propagating direction toward the upstream of system 10 and eventually delivers this light into the core of combiner output fiber 20, Accordingly, when back reflected light propagates and bleeds through splice 22 (FIG. 2) into inner cladding 34 (FIG. 2a), it should be removed therefrom before it couples into claddings of respective SM fibers 16 (FIGS. 1 and 2)

Turning to FIGS. 2 and 2a, the absorber includes a layer 38 extending over upstream zone 26 (FIG. 2a) around outer coating 36. The layer 38 is operative to at least substantially minimize and, ideally, completely remove the core guided back reflected light, which manages to bleed through splice 22 from the core of fiber 20, since its refractive index is higher than that of quartz constituting both core 44 and claddings.

Referring to FIGS. 2 and 2b, intermediate zone 28 extends from the end of upstream zone 26 over the downstream end of combiner fiber end 19 (FIG. 2), through splice 22 and terminates at a distance from the end region of output fiber 20. The latter is stripped from its protective cladding along intermediary zone 28. Instead, it is a polymeric layer 39 that covers inner cladding 42 of output fiber 20 which has a refractive index at least equal to or higher than that of polymeric layer 39, Accordingly, layer 39 is configured to minimize losses of forward propagating signal light by preventing its decoupling from cladding 42.

Referring to FIGS. 2, 2c and 2d, downstream zone 30 of the absorber is configured with a polymeric layer 40 which is configured to minimize the amount of forward propagating signal light guided along cladding 42 of combiner output fiber 20. The zone 30 extends over a larger portion of output fiber 20, which is stripped from the protective coating, and partly overlays the downstream end of this fiber still having a protective layer 46 (FIG. 2d). The latter is left intact along the end region of combiner output fiber 20 to improve coupling of fiber 20 to a housing 24.

Similar to polymeric layer 39 of the intermediary zone 28, layer 40 is configured with a host material, such as silicone gel, which has a refractive coefficient substantially equal to that of quartz. However the host material along zone 30 is doped with a plurality of diffusers including, for example, particles of $Al_2O_3$. The diffusers do not absorb light incident thereupon; they omni-directionally scatter with a portion of scattered light being directed outside fiber 20. Thus, the low NA forward propagating clad-guided light, when incident on the diffusers, can be partially guided into a potting material, housing 24 and finally to a heat sink not show here. The concentration and distribution of diffusers are selected to provide a substantially uniform remove of low NA single light along region 30 (FIG. 2)

The absorbed light, whether it is forward- or back reflected-propagating light should be efficiently transferred to a heat sink; otherwise the structural integrity of combiner 18 can be irreversibly compromised. The housing 24, enclosing combiner 18 and part of output fiber 20 which are protected by the absorber, is provided with semi-spherical groove 25 (FIGS. 2 and 2a) receiving combiner 18 and thus contributing to the mechanical and thermal stability of the entire laser system. The material of housing 24 is selected with high heat resistance and low coefficient of thermal expansion so as to minimize the degree of deformation of housing 24 at elevated temperatures during the operation of the disclosed fiber laser system. Otherwise, the housing's deformation may damage fibers. Preferably, the material includes copper layered with a strip of gold or a tungsten copper (CuW) pseudo alloy. Upon placing the absorber mechanism in housing 24, groove 25 and other free space within housing 24 is filled with potting material that even further contributes to the mechanical and thermal integrity of the disclosed structure.

Turning briefly to FIG. 1, system 10 may have a reliable monitoring system including several photodiode detectors, For example, a sensor 100 is positioned in close vicinity of the upstream of combiner 18 to detect backreflected light propagating along the core 44 (FIG. 2a). The sensor 102 is configured to measure output power of signal light at the output of combiner 18. The photodiode 104 is located to detect back-reflected light propagating along the cladding of a system absorber 80. The power losses of signal light can be monitored a sensor 106 capable of sensing direct light in the vicinity of splice 22. All or at least part of the sensors can be configured to detect scattering light as disclosed in U.S. Provisional Application Ser. No. 61/653,108, the contents of which is incorporated by reference in its entirety.

Returning to FIG. 3, the SM-LM combiner 18 preferably includes thirteen (13) SM fibers 16 with twelve fibers surrounding the central fiber. All thirteen fibers 16 each preserve its geometry, which, as explained above, includes multiple concentric claddings which are not deformed since only additional outer cladding 38 (FIG. 2a) are being fused to one another. Since the deformity is insignificant or absent at all, combiner 18 is characterized by minimal losses and high beam product parameter. Generally, the 13/1 combiner may be described as having a continuous periphery with alternating peaks or protrusions and valleys. The illustrated geometry can be easily altered. For example, removing the outer six fibers results in a 7-to-1 combiner, whereas adding an additional 6 fibers each between respective pair of adjacent peaks defines a 19/1 combiner. The advantages of the 13/1 combiner over, for example, a 19/1 combiner include higher beam product parameter, more time-effective fabrication process, easier testing and maintenance.

FIG. 4 illustrates filtering splice region 70 of system 10 configured to prevent high NA rays of forward propagating or signal light from reaching the output end of system fiber 23, also shown in FIG. 1. These rays are guided along a cladding after escaping a splice 72 between combiner output fiber 20 and system output fiber 23. The latter may be configured with a NA higher than that of fiber 20 and is preferably a MM passive fiber.

The fibers 20 and 23, respectively, each are stripped from a protective polymeric layer 78 within splice region 70. A mixture of polymer with relatively low refractive index (about 140) and diffusers such as $Al_2O_3$, doped in the polymer, covers a stripped region 74 of output fiber 20. The stripped region 76 of system output fiber 23 is coated with a polymer having a high refractive index. The structure is enclosed in a housing 77 which is preferably made from gold-plated copper.

Figure 5:
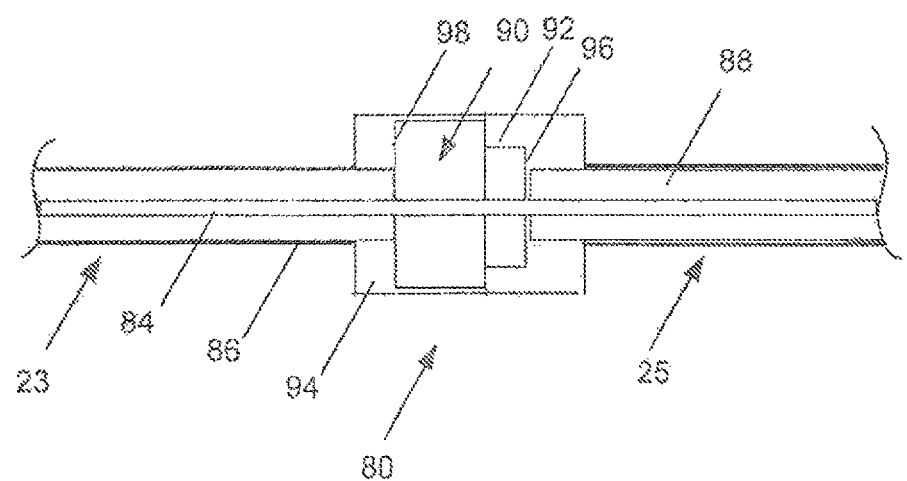
FIG. 5 is a diagrammatic view of the system clad mode absorber component of the disclosed system configured to remove backreflected, cladding-guided light

FIG. 5 illustrates system CMA 80 provided between the downstream end region of system output fiber 23 and delivery fiber 25. The absorber 80 is configured with a MM passive fiber 90 which, in combination with polymers 94 and 92, strips backreflected light which propagates along the cladding of delivery fiber 25. The latter is fosed to downstream face 96 of fiber 90 and has its cladding 88 receive backreflected light from the workpiece to be laser treated.

Referring to FIGS. 1 and 2 in addition to FIG. 5, the diameter of core 84 of system fiber 23 matches the core diameters of respective combiner end fiber 19, combiner output fiber 20, and system delivery fiber 25. The diameter of cladding 88 of system delivery fiber 25 is likewise formed equal to the cladding diameters of these fibers. The outer diameter of stripping fiber 90, however, may be several times greater than that of the rest of the fibers. The increased cladding diameter of fiber 90 allows the coupled backreflected light to lower its power density, which, in turn, thermally unloads its protective coatings such as polymers 92 and 94, respectively. The cladding diameter of fiber 90 may be gradually increased by structuring downstream face 96 of fiber 90 with a diameter smaller than the diameter of its upstream, end 98. This can be done by providing another, smaller fiber or a shaping single piece fiber with a bottle-shaped cross-section along the longitudinal axis of the stripping fiber.

The polymer 92 surrounding downstream face 96 of fiber 90 is configured with a refractive index lower than that of quartz/cladding 88. The lower refractive index confines propagation of backreflected light to cladding 88. The upstream, face 98 of stripping fiber 90 is covered with polymer 94 having a refractive index higher than quartz to decouple relatively low-density backreflected cladding propagating light from the waveguide.

A variety of changes of the disclosed structure may be made without departing from the split and essential characteristics thereof. Thus, it is intended that all matter contained in the above description should be interpreted as illustrative only and in a limiting sense, the scope of the disclosure being defined by the appended claims.

The invention claimed is:

1. A low-mode ("LM") high power combiner, comprising:
a plurality of single mode ("SM") passive fibers guiding respective SM outputs, the SM fibers being bundled together to define a taper narrowing to an end fiber, the end fiber having a core guiding combined LM signal light in a propagating direction, and at least one cladding;
a multimode combiner output fiber butted to the end fiber to define a splice, the output fiber having a cladding surrounding a core which guides the LM light, the LM light being incident on a workpiece partially reflecting the incident light so that a portion of the reflected light is coupled into the core of the output fiber guiding the reflected light in a counter-propagating direction; and
a clad mode absorber ("CMA") surrounding the end fiber and extending over a part of the combiner output fiber, the absorber being configured with:
an upstream zone extending along the end fiber and terminating at a distance upstream from the splice, the upstream zone being configured to strip a portion of the reflected light coupled into the core of the combiner output fiber and bled through the splice into the cladding of the end fiber,
an intermediary zone extending over the splice and regions of respective end and output fibers bordering the splice, the intermediary zone being configured to prevent decoupling of a portion of the LM light bled into the cladding of the output fiber,
a downstream, zone extending over the output fiber and terminating at a distance from a downstream end thereof, the downstream zone being configured to scatter low numerical aperture ("NA") rays of the LM light guided along the cladding.

2. The combiner of claim 1, wherein the CMA includes a polymer configured with:
a fast index of refraction higher than that of the cladding of the end fiber along the upstream zone,
a second index at most equal to that of the claddings of respective fiber regions bordering the splice and defining the intermediary zone, and
a third index at most equal to that of the cladding of the output fiber along the downstream zone, the polymer of the downstream zone being doped with a plurality of diffusers configured to scatter the portion of the LM light.

3. The combiner of claim 2, wherein the diffusers include particles of aluminum oxide ($Al_2O_3$).

4. The combiner of claim 1, wherein SM fibers each are configured with:
an inner layer made from silicon dioxide ($SiO_2$), and
an outer layer made from $SiO_2$ and doped with fluoride (F) ions.

5. The combiner of claim 1 further comprising a housing enclosing the absorber, the outer layer of the system output fiber being stripped from a protective coating along intermediary zone and a larger portion of the downstream zone.

6. The combiner of claim 1, wherein thirteen SM fibers are bundled together to define a continuous periphery with alternating peaks and valleys.

7. The combiner of claim 1 further comprising six additional fibers or six fewer SM fibers defining a 19/1 combiner or a 7/1 combiner, respectively.

8. The combiner of claim 7, wherein the LM light is emitted from the downstream end of the combiner output with a beam product parameter ranging between about 1.7 and about 4.0.

9. The combiner of claim 1 further comprising an upstream light detector operative to detect backreflected core guided light.

10. A high power fiber laser system, comprising:
the combiner of claim 1;
a multimode ("MM") passive filter fiber fused to the combiner output fiber to define a downstream splice;
a filter surrounding adjacent regions of respective combiner output and delivery fivers and configured to minimize propagation of high NA rays of the LM signal light in the propagating direction, the filter being configured with upstream and downstream zones, wherein the upstream zone includes a polymeric host material having an index of refraction at most equal to that of the cladding of the combiner output fiber, and a plurality of diffusers doped in the host material, and
the downstream zone is configured with a polymeric material with an index of refraction higher than that of the cladding of the combiner output fiber.

11. The high power fiber laser system of claim 10, wherein the additives include particles of aluminum oxide.

12. The high power fiber laser system of claim 10, wherein the adjacent regions of respective combiner output and filter fibers are stripped from respective protective layers.

13. The high power fiber laser system of claim 10, wherein the combiner output and MM passive input fibers are configured with respective core diameters matching one another.

14. The high power fiber laser system of claim 10 further comprising a stripping fiber having opposite ends fused to a downstream end of the MM passive filter fiber and an upstream of a MM passive feeding fiber, respectively, the feeding fiber being configured with a core and a cladding both receiving the backreflected light.

15. The high power fiber laser system of claim 14, wherein the MM filter, stripping and feeding fibers are configured with respective cores which are dimensioned to match one another.

16. The high power fiber laser system of claim 15, wherein an outer diameter of a cladding of the stripping fiber is larger than those of the MM filter and feeding fibers to reduce power density of the backreflected light propagating along the cladding of the stripping fiber.

17. The high power fiber laser system of claim 16 further comprising a clad mode absorber ("CMA") configured with a downstream, region, which extends over the upstream end of the feeding fiber, and an upstream region extending over the downstream end of the MM filter fiber and an entire length of the stripping fiber.

18. The high power system of claim 17, wherein the upstream region of the CMA includes polymeric material with a refractive index higher than that of the claddings of respective MM input passive and stripping fibers, and a downstream region of the CMA being configured with a refractive index lower than or matching that of the cladding of the feeding fiber.

* * * * *